(No Model.)
C. YOUNG.
BICYCLE GEARING AND BRAKE.
No. 593,289. Patented Nov. 9, 1897.
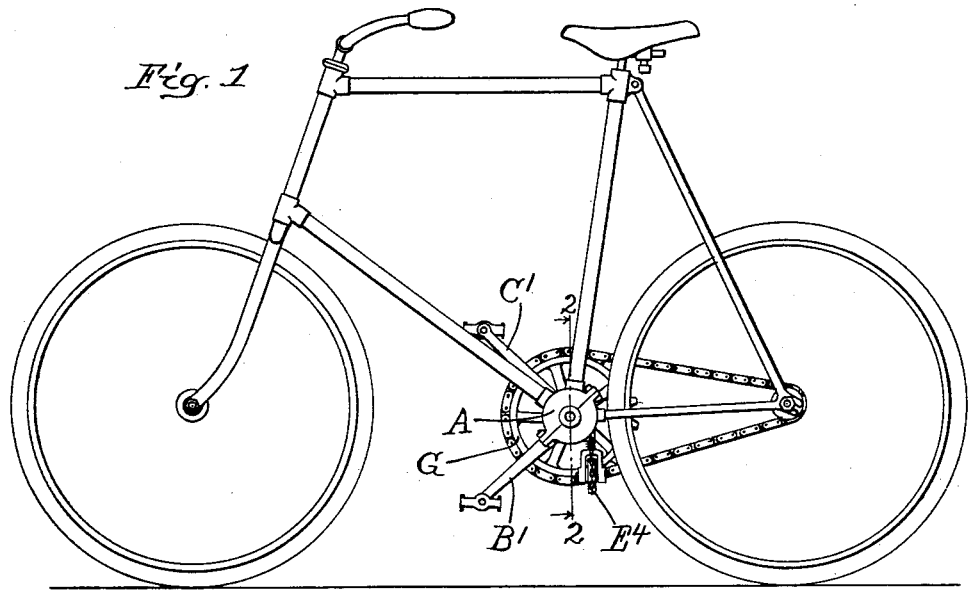
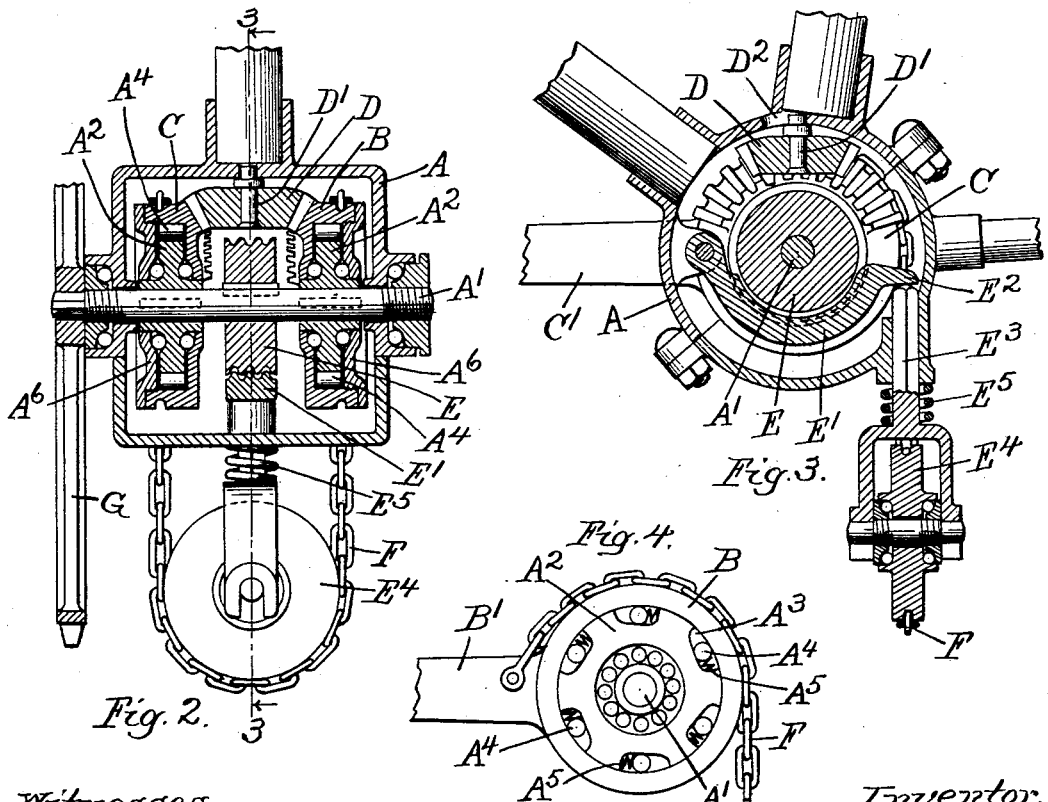
Witnesses.
E. T. Wray.
Donald M. Carter.
Inventor.
Carl Young,
by Francis W. Parker,
his Atty.

UNITED STATES PATENT OFFICE.

CARL YOUNG, OF CHICAGO, ILLINOIS.

BICYCLE GEARING AND BRAKE.

SPECIFICATION forming part of Letters Patent No. 593,289, dated November 9, 1897.

Application filed August 19, 1896. Serial No. 603,187. (No model.)

*To all whom it may concern:*

Be it known that I, CARL YOUNG, a citizen of the United States, residing at Chicago, in the county of Cook and State of Illinois, have invented certain Improvements in Bicycles, of which the following is a specification.

My invention relates to bicycles, and has for its object to provide a bicycle provided with a new and improved power-transmitting mechanism.

My invention is illustrated in the accompanying drawings, wherein—

Figure 1 is a view of a bicycle provided with my power-transmitting device. Fig. 2 is a section on line 2 2, Fig. 1. Fig. 3 is a section on line 3 3, Fig. 2. Fig. 4 is a side view of one of the bevel-gears with one side removed, exposing the clutch contained therein.

Like letters refer to like parts throughout the several figures.

The power-transmitting mechanism is contained within the case A, to which the various parts of the frame of the bicycle are connected. The crank-shaft $A'$ is mounted in said case and is provided with the disks $A^2$ $A^2$, rigidly connected therewith. These disks are contained within the hollow bevel-gears B C. (See Fig. 2.) The disks $A^2$ are provided on their peripheries with the recesses $A^3$ $A^3$, containing the rollers $A^4$ $A^4$. Said recesses vary in depth and are so shaped that when the rollers are in the deep parts thereof said rollers will not be in contact with the bevel-gears, but when said rollers are in the shallow parts of the recesses they will be in contact with both the disks and the gears. Each roller is provided with a spring $A^5$, tending normally to keep it in the shallow part of its recess. The bevel-gears B and C are rotatably mounted on the shaft $A'$ in any suitable manner, and the pedal-levers $B'$ and $C'$ are directly connected with said gears in any desirable manner. As shown in the drawings, the pedal-levers are integral with the bevel-gears. The bevel-gears are hollow, as shown, and are provided with removable caps or disks $A^6$ $A^6$, the parts being so constructed that the clutch mechanism may be easily and quickly placed within the hollow of said gears. A pinion D is connected with the case A or with a stationary part of the frame in any convenient manner and connects the two bevel-gears together. As shown in the drawings, this pinion is mounted upon a short shaft $D'$, the end of said shaft being contained within a slot $D^2$ in the case A, so that the pinion may be moved with relation to the case. A brake-wheel E is keyed to the shaft $A'$ and is provided with an opposed brake-shoe $E'$. These parts may be constructed in any desirable manner. As shown in the drawings, the brake-shoe $E'$ is pivoted to the case A, said brake-shoe and brake-wheel being provided with grooves, so as to increase the braking-surface. Said brake-shoe is provided with a projecting end piece $E^2$, having opposed thereto a rod $E^3$, to which is connected a pulley $E^4$. Said rod is mounted in the case A so as to be free to move longitudinally and is provided with a coil-spring $E^5$, which normally holds it away from the brake-shoe, the spring being compressed when the rod is moved to apply the brake. A chain or other power-transmitting device F is connected at each end with the respective pedal-levers, as shown, and passes over the pulley $E^4$. The rod $E^3$ is preferably constructed so that it cannot be rotated. As shown in the drawings, this object is accomplished by making the rods polygonal in shape. A sprocket-wheel G is rigidly connected with the shaft A and is operatively connected with one wheel in the bicycle. The bevel-gears B and C may be provided with teeth extending completely around the beveled surface thereof; but as shown in the drawings said gears are only provided with sufficient teeth to allow the desired movement of the pedal-levers. I have described these several parts in detail; but it is evident that they may be varied in form, construction, and arrangement without departing from the sphere of my invention, and I therefore do not wish to be limited to the exact construction shown.

The use and operation of my invention are as follows:

When it is desired to propel the bicycle, the rider presses alternately upon the pedal. When, for example, the pedal-lever $B'$ is moved downward, the rollers $A^4$ are moved to the shallow parts of the recesses, so as to lock the disk $A^2$ and the bevel-gear B together, so that they move as one piece. The movement of the pedal-lever is therefore communicated to the shaft $A'$ and thence to the sprocket-wheel. The pedal-levers are connected together by means of the bevel-gears and pinion, so that when one is moved downwardly, for example, the other is moved in an opposite direction. The pedal-lever C' will therefore be moved upward when the pedal-lever B' is moved downward. The relative movement of the gear-wheel C and the disk $A^2$ is therefore such that the rollers $A^4$ are moved to the deep parts of the recesses and are therefore out of contact with the gear-wheel, thereby allowing the gear-wheel to move without moving the disk. When the pedal-lever B' has reached the limit of its movement, the rider presses upon the pedal-lever C'. Said latter pedal-lever is then connected with the shaft, so as rotate the same, and the lever B' is moved to its operative position. It will be seen that by this construction the power-transmitting mechanism is located intermediate between the bearings of the pedal-shaft, obviating completely any side draft on the frame, and is composed of a few parts compactly arranged, so as to occupy only a small amount of space, thereby producing an exceedingly narrow-tread bicycle.

When it is desired to stop the bicycle, the rider presses simultaneously upon both pedals, so as to move pulley $E^4$ and rod $E^3$ against the pressure of the spring $E^5$, thereby moving the brake-shoe $E^2$ against the brake-wheel E. The slot $D^2$ allows this movement, for when the pedals are simultaneously pressed the short shaft D' is moved from its normal position to the opposite end of the slot. The movement of the pulley $E^4$ and associated parts is of course due to the chain F. When the pressure on the pedals is relieved the spring $E^5$ moves the parts, so that the brake-shoe is disengaged from the brake-wheel. It will therefore be seen that by this mechanism when the pedal-levers are alternately pressed they are connected with the shaft, so as to rotate the same, and when they are simultaneously pressed the brake is applied to stop the bicycle.

I claim—

1. A power-transmitting device for vehicles and the like, comprising a driven shaft, two bevel-gears rotatably mounted upon said shaft, each bevel-gear provided with a clutching mechanism adapted to connect it with the shaft when moved in one direction, but allowing it to move in an opposite direction free from said shaft, a pinion connecting said bevel-gears so that a movement of one causes an opposite movement of the other and a lever adapted to be operated by the foot, directly connected with each of said bevel-gears whereby the shaft is driven when the levers are alternately operated.

2. A power-transmitting device for vehicles and the like, comprising a driven shaft, two hollow bevel-gears rotatably mounted upon said shaft, a clutch mechanism located within the hollow of said gears and adapted to connect said gears with the shaft when moved in one direction but allowing them to move free from the shaft in an opposite direction, a pinion connecting the bevel-gears together, so that a movement of one causes an opposite movement of the other, and a foot-operated lever directly connected to each of said bevel-gears.

3. A power-transmitting device for vehicles and the like, comprising a driven shaft, two bevel-gears rotatably mounted upon said shaft, each bevel-gear provided with a clutching mechanism adapted to connect it with the shaft when moved in one direction, but allowing it to move in an opposite direction free from said shaft, a movable pinion connecting said bevel-gears so that a movement of one causes an opposite movement of the other and a lever adapted to be rotated by the foot, directly connected with each of said bevel-gears, a braking-surface connected with said shaft, a brake-shoe opposed to said braking-surface, a longitudinally-movable rod in proximity to said brake-shoe, a spring associated with said rod and normally holding it away from said brake-shoe and a connection between said rod and said levers whereby the rod is moved so as to apply the brake-shoes when the levers are simultaneously pressed.

4. A power-transmitting mechanism comprising a driven shaft, mounted in suitable bearings, two hollow bevel-gears rotatably mounted upon said shaft intermediate between said bearing, a pinion connecting said bevel-gears so that a movement of one causes an opposite movement of the other, a clutch mechanism contained within the hollow of said gears and adapted to connect them with the shaft when the gears are moved in one direction, said gears being free from the shaft when moved in an opposite direction, a cap or cover adapted to be connected with said gears, so as to completely inclose said clutch mechanism, a lever associated with each of said gears and adapted to be operated by the foot, said levers being integral with said gears.

5. A power-transmitting mechanism comprising a driven shaft mounted in suitable bearings, two hollow bevel-gears rotatably mounted upon said shaft intermediate between said bearings, a disk within the hollow of each of said gears and keyed to said shaft, each disk provided with recesses of varying depth, spring-pressed rollers contained within said recesses and adapted to lock the disks and gears together when in the shallow part of the recesses, the said gears and disks being free to move relatively when the said rollers are in the deep parts of said recesses, a pinion connecting said bevel-gears so that a movement of one causes an opposite movement of the other, a lever integral with each of said bevel-gears and said levers provided at their ends with pedals substantially as described.

6. The combination in a bicycle of a driven shaft, two pedal-levers associated with said shaft and provided with clutches, said clutches so constructed that the pedal-levers are connected with the shaft when moved in one direction, but are free from said shaft when moved in an opposite direction, a braking-surface connected with said shaft, a brake-shoe pivotally connected to some stationary part of the bicycle and opposed to said braking-surface, a longitudinally-movable rod mounted in a part of the frame of the bicycle and in proximity to one end of said brake-shoe, a spring associated with said rod and normally holding it away from said brake-shoe, a pulley connected with said rod and a chain or the like passing over said pulley, the ends being respectively connected to said pedal-levers substantially as described.

7. The combination in a bicycle of a driven shaft, two bevel-gears rotatably mounted upon said driven shaft, a clutch associated with each of said bevel-gears and adapted to connect them with the shaft when the gears are moved in one direction, said gears being free from said shaft when moved in an opposite direction, a pinion connecting said gears together so that a movement of one causes an opposite movement of the other, said pinion connected with the shaft engaging a slot in a stationary part of the bicycle-frame, the part so constructed that the pinion is free to move with relation to said frame, a pedal-lever connected with each of said gears, a brake-wheel on said shaft, a brake-shoe associated with said brake-wheel, a longitudinally-movable rod adapted to engage said brake-shoe and force it into contact with said brake-wheel, a spring normally holding said rod away from said brake-shoe and a connection between said rod and each of said pedals whereby when the pedals are simultaneously pressed, the brake is applied substantially as described.

Chicago, Illinois, August 10, 1896.

CARL YOUNG.

Witnesses:
LILLEY W. JOHNSTONE,
E. T. WRAY.